United States Patent
Oliverlo (10) Patent No.: US 9,308,416 B1
(45) Date of Patent: Apr. 12, 2016

(54) GLIDE EXERCISER

(71) Applicant: Jon Oliverlo, Doylestown, OH (US)

(72) Inventor: Jon Oliverlo, Doylestown, OH (US)

( * ) Notice: Subject to any disclaimer, the term of this patent is extended or adjusted under 35 U.S.C. 154(b) by 83 days.

(21) Appl. No.: 14/215,022

(22) Filed: Mar. 16, 2014

(51) Int. Cl.
*A63B 21/00* (2006.01)
*A63B 23/12* (2006.01)

(52) U.S. Cl.
CPC ......... *A63B 23/1236* (2013.01); *A63B 21/1469* (2013.01)

(58) Field of Classification Search
USPC .................................. 482/121, 141, 126, 132
See application file for complete search history.

(56) References Cited

U.S. PATENT DOCUMENTS

| 4,351,525 | A  | * | 9/1982  | Rozenblad  | 482/141 |
| 2009/0298656 | A1 | * | 12/2009 | Dannenberg | 482/141 |
| 2014/0066274 | A1 | * | 3/2014  | Kassel     | 482/141 |

* cited by examiner

*Primary Examiner* — Jerome W Donnelly
(74) *Attorney, Agent, or Firm* — John D. Gugliotta (57) ABSTRACT

An exercise device is provided having a pair of handles supporting a pair of glide discs that allows the user to support themselves while moving the handles in one or more planes. The portable exercise device and method for using the same that is adaptable for working numerous muscle groups. The instant abstract is neither intended to define the invention disclosed in this specification nor intended to limit the scope of the invention in any way.

9 Claims, 6 Drawing Sheets

GLIDE EXERCISER

RELATED APPLICATIONS

The present application claims benefit of U.S. Provisional Ser. No. 61/788,598, filed on Mar. 15, 2013 and incorporate by reference as if fully rewritten herein.

BACKGROUND OF THE INVENTION

1. Field of the Invention

The present invention relates, in general, to an exercise device and a method of using the same. More particularly, the present invention relates to a low friction glide type exercise device and method for using the same that is adaptable for strength training and muscle building by working numerous muscle groups.

2. Description of the Related Art

Home exercise is becoming increasingly more popular. Home exercise offers the health benefits of regular exercise while recognizing that many people have difficulty in finding sufficient time in their schedule for a full workout at a health club or gymnasium. An exerciser may exercise at home whenever the exerciser's schedule permits. This flexibility in scheduling often allows for a more consistent and thus healthful exercise regime.

Home exercise, however, has its drawbacks. In particular, in order to exercise all or most of the muscle groups, multiple pieces of home exercise equipment may be required. Furthermore, these multiple pieces of equipment may require permanent installation in the exerciser's home.

Permanent or not, many popular pieces of home exercise equipment occupy a great deal of space. This makes the use of this equipment impractical in homes or apartments which do not have the required extra space. Furthermore, non-permanent pieces of equipment are often difficult to disassemble and may require much storage space even when disassembled. A user must then often choose between an exercise device providing a complete exercise regime and a device which fits the exerciser's home space.

There is, thus, a need for exercise equipment which may be easily stored when not in use, does not occupy a great deal of space when in use and provides for exercising all or most of the muscle groups.

Some methods and devices are known. For example:

U.S. Pat. No. 5,226,868 issued in the name of Montgomery discloses a power push-up device that has a flat fixed base onto which a number of push up gripping handles are positioned at various angles (symmetrically about a centerline).

U.S. Pat. No. D662,997 issued in the name of Su discloses an ornamental design for a fitness device that includes two aligned handles.

U.S. Patent Publication US2005/0148448, published in the name of Mersch, describes a portable push-up board having two pairs of gripping handles. One pair is positioned laterally, and the second paired positioned perpendicularly are laterally slidable.

U.S. Pat. No. D599,417 issued in the name of Friedman et al. discloses a push-up exercise device that has a gripping, not a sliding, lower surface.

U.S. Pat. No. D654,545 issued in the name of Richard discloses a push up device having lower rollers.

U.S. Pat. No. D580,998 issued in the name of Lin discloses a push-up exerciser showing an offset handle supported above a pair of laterally elongated base elements.

U.S. Pat. No. D354,100 issued in the name of Tsay et al. discloses a pushup exerciser stand.

U.S. Pat. No. 7,951,055 issued in the name of Mulderrig et al. discloses push up blocks that have a pointed, balancing apex on its lower support surface.

U.S. Pat. No. 7,585,262 issued in the name of Vayntraub discloses convex shaped pushup handles.

And, U.S. Patent Publication US 2010/0087301, published in the name of Juncker, describes a balancing device similar to a "wobble" board that has a pivoting lower pedestal that could possibly be used as part of sliding exercise regime.

Consequently, a need has been felt for providing a portable exercise device and method for using the same that is adaptable for working numerous muscle groups.

SUMMARY OF THE INVENTION

It is an object of the present invention to provide for an improved portable exercise device and method for using the same that is adaptable for working numerous muscle groups.

It is a feature of the present invention to provide such a device that includes a specialized graspable handle devices incorporating a low friction gliding or sliding pad over a lower surface that contacts with the floor.

Accordingly to a preferred embodiment of the present invention, a portable exercise device is provided incorporating a unique offset gripping devices. While it is intended that some exercises may require the use of a pair of such gripping exercise devices, one for each hand, each singular gripping device is anticipated as being of a similar shape and configuration. Each 'device' includes a pair of laterally aligned base supports which are offset from each by and immediately connected to a main horizontal handle support structure. Each base support is affixed to or integrated with the handle such as to allow for a space formed adjacent to at least a lower side of the handle such as when gripped a user can place the device against a support surface without interference with his or her grip. Each base support further has a lower surface for attachably supporting a glide disc or pad. Each glide disc or pad forms a low friction surface to allow the user to move the device along a surface while providing force in more than one plane.

It is an advantage of the present invention to provide an exercise device that can be used for push ups.

It is a further advantage of the present invention to allow for other exercise motions in multiple planes to be executed.

Further, the present invention is light weight, inexpensive, portable, has a small form factor, and can be adapted for use in numerous exercise regimens.

Further implementations of the aspect of the invention described immediately above include one or more of the following. The unique offset gripping devices can be of various designs and configurations, either symmetric or asymmetric, and can have glide discs that are replaceable when worn or to vary the amount of frictional resistance desired.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. While shown and described as low friction glide type exercise device, it should be obvious to a person having ordinary skill in the relevant art, in light of the present teachings of the present invention, and any adaptation for use with and method for using the same that is adaptable for strength training and muscle building by working numerous muscle groups should seen as an equivalent application.

1. Detailed Description of the Figures

Referring now to FIG. 1-4, a glide exercise system, generally noted as 10, is shown accordingly to a preferred embodiment of the present invention, in which a pair of portable glide exercisers 12 exercise devices are provided incorporating a unique offset gripping configuration. Each gripping device 12, anticipated as providing a graspable support surface, one for each hand of user, is anticipated as being of a similar bilobal shape and configuration to each other. Each device 12 includes a pair of laterally aligned base supports 14 which are offset from each other by and immediately connected to a main horizontal handle support structure 13. The base supports 14 form a lobe structure terminating each opposite end of the handle 13. Each base support 14 is affixed to or integrated with the handle 13 such as to allow for an offset space, generally noted as 20, adjacent thereto. Each base support 14 further has a lower surface 22 for attachably supporting a low friction support surface referred to as a glide disc or pad 24. At the top of each base support 14 may be a non-skid surface 30 to allow for a gripping, nonslip surface in the event the device 12 is uses as a cross country ski simulator by standing atop or otherwise exercising the lower body. Each glide disc or pad 24 forms a low friction surface 26 to allow the user to move the device along a surface while providing force in more than one plane. Additionally, a compressible member 28, such as felt pad, rubber disc or similar element may further be mounted between the glide disc 24 and the lower surface 22 in order to provide for a limited pivoting capability so that the low friction surface 26 can maintain contact with a support surface when in use.

Finally, each glide disc or pad 24 forms a low friction surface 26 to allow the user to move the device along a surface while providing force in more than one plane. As shown and described herein, the glide disk 24 forms a sphere segment in which the low friction surface 26 is formed of a spherical cap outer surface of a generally smooth and rigid material such as to provide a low friction contact surface for contact with a flat support surface, such as floor. However, while such a design choice is depicted and described for purposes of enabling the present disclosure, it should be apparent to a person having ordinary skill in the relevant art, in light of the present disclosure, that any alternately designed low friction gliding surface should be considered as equivalent.

2. Operation of the Preferred Embodiment

Figure 1:
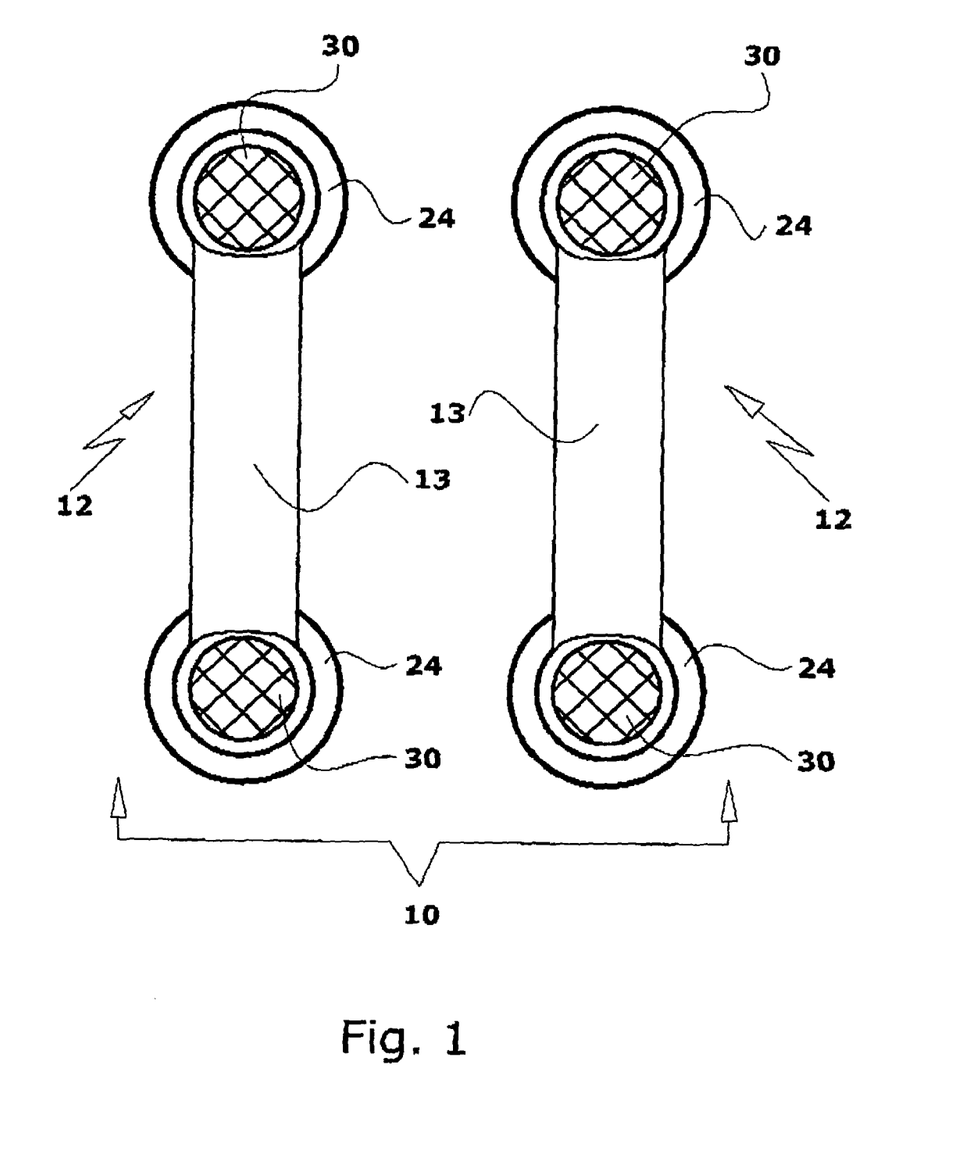
FIG. 1 depicts top plan view of a pair of a glide exercisers 12 in accordance with a preferred embodiment of the present invention.
Figure 2:
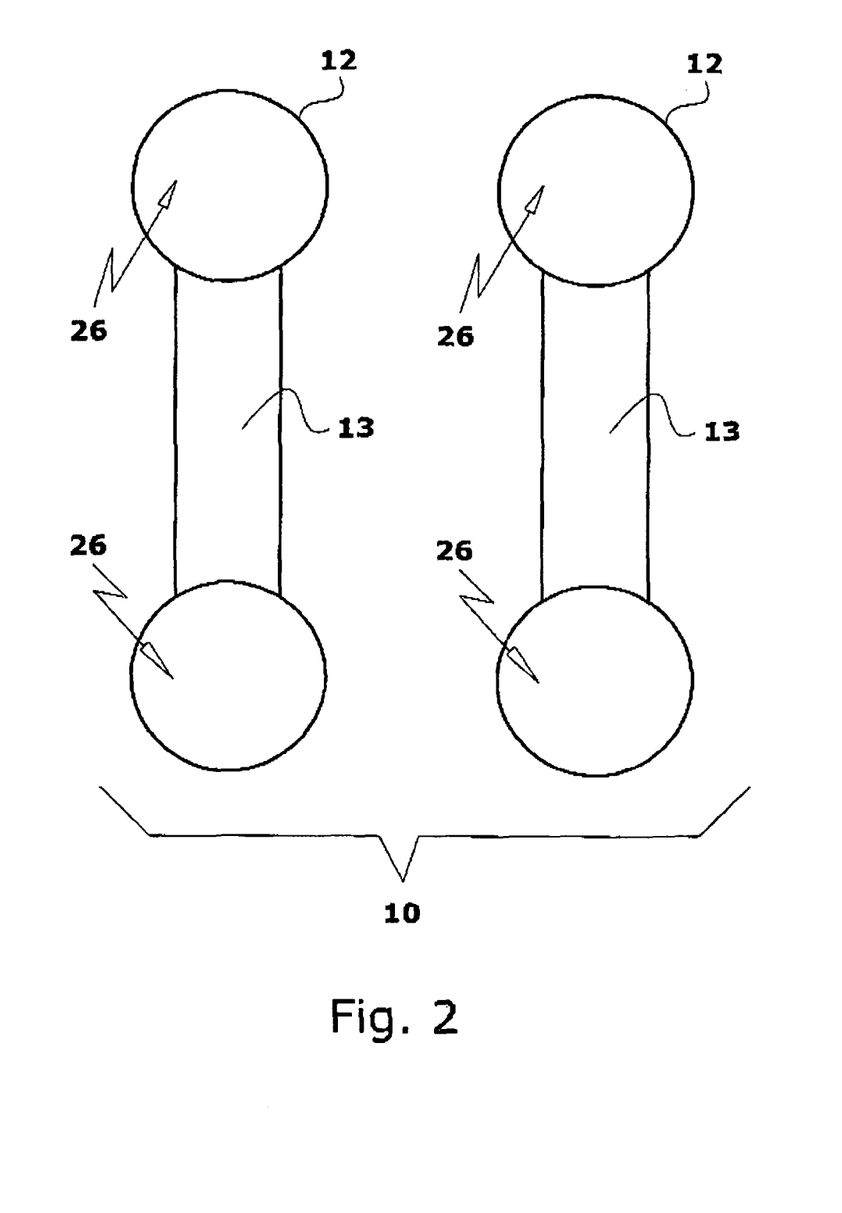
FIG. 2 depicts a bottom plan view thereof.
Figure 3:
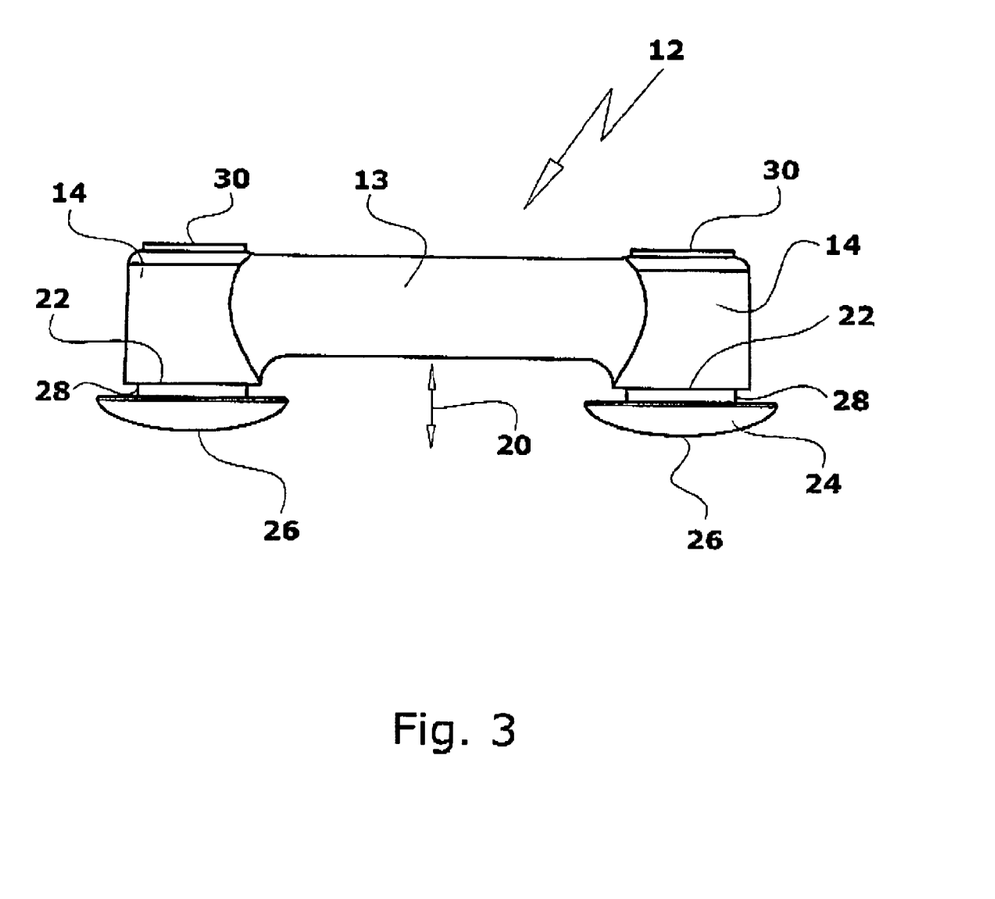
FIG. 3 depicts a side elevational view of a single glide exerciser 12 as shown in FIG. 1-2.
Figure 4:
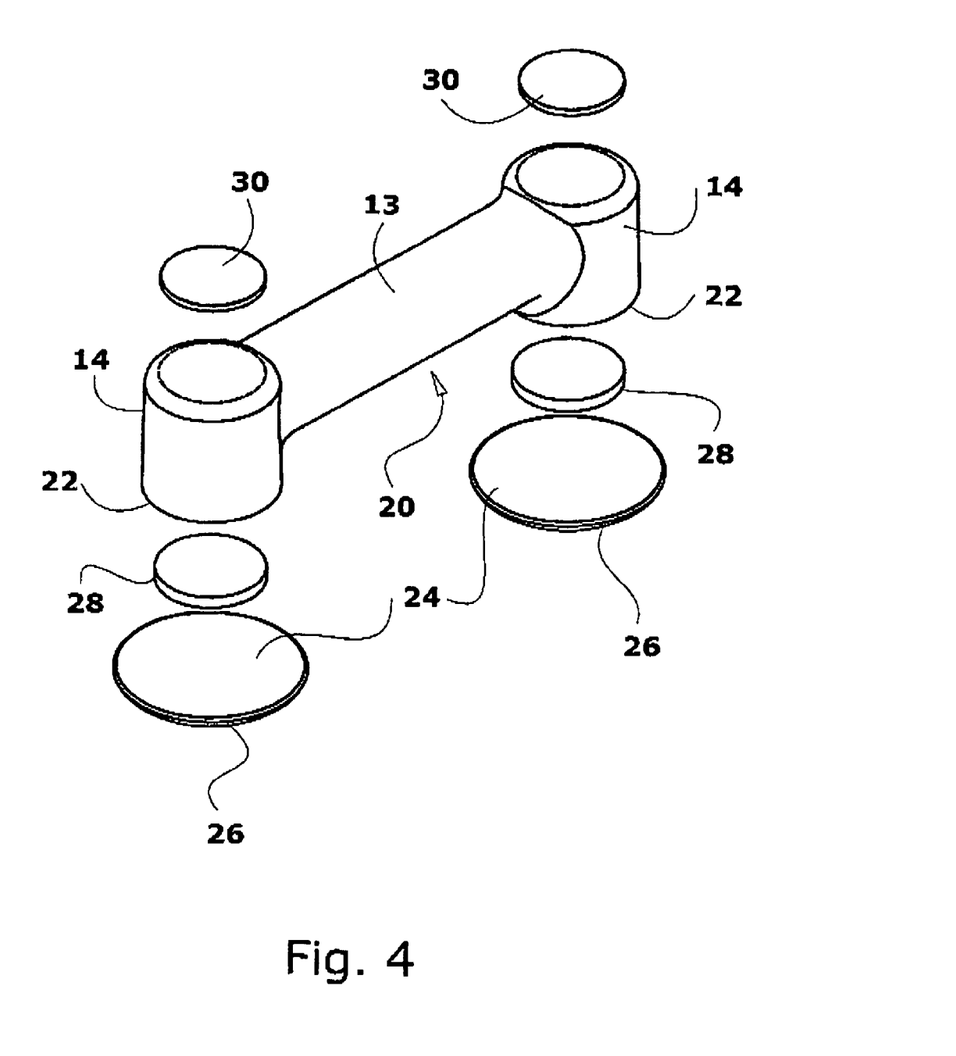
FIG. 4 is an exploded perspective view of a the glide exerciser 12 of FIG. 3.
Figure 5:
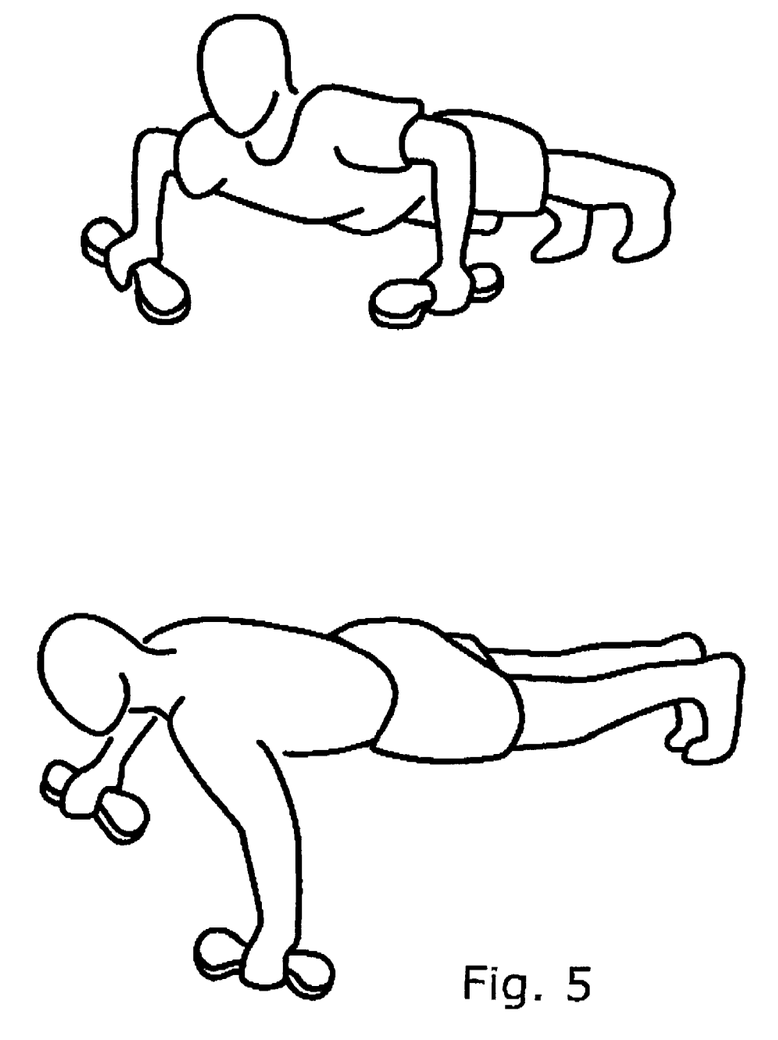
FIG. 5 is a schematic representation of a first exemplary embodiment of an exercise using a pair of glide exercisers of FIG. 1-4.

Referring now in conjunction with FIG. 5, in use each base support 14 is affixed to or integrated with the handle 16 such as to allow for a space, generally noted as 20, to be formed adjacent to at least a lower side of the handle 16 such as when gripped a user can place the device against a support surface without interference with his or her grip. When gripped, the user can then support himself or herself against a surface by contacting the friction surface 26 of the glide pad 24. Whether merely doing 'push ups' or expanding the exercise repertoire to push-ups by lateral movement in alternate planes or other such variations, the present glide exercisers can provide an exercise device that is light weight, inexpensive, portable, has a small form factor, and can be adapted for use in numerous exercise regimens. The absence of a rigid track or rail allows the user to exercise about a much more varied range of motion.

Figure 6:
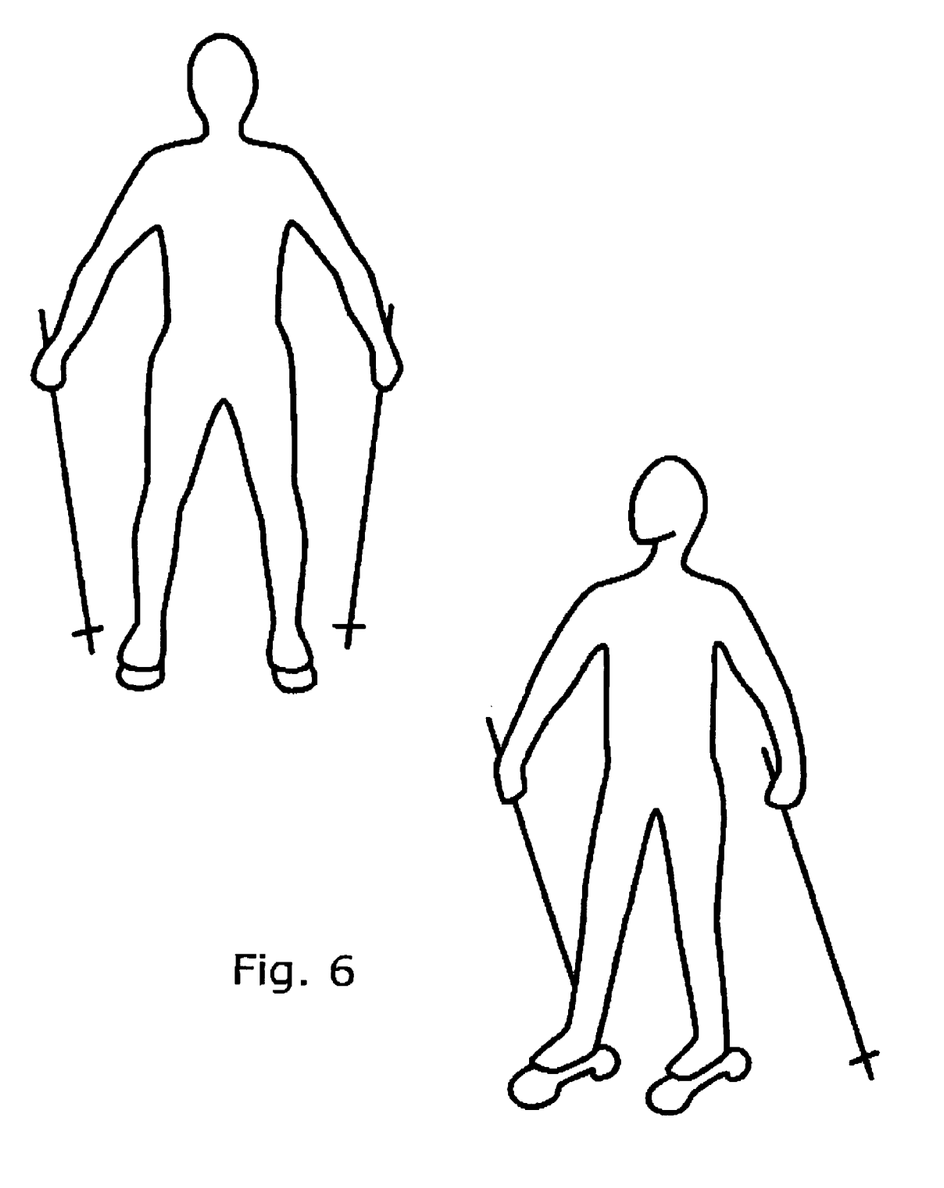
FIG. 6 is a schematic representation of an alternate exemplary embodiment of an exercise using a pair of glide exercisers of FIG. 1-4.

Referring now in conjunction with FIG. 6, in an alternate use each base support 14 supports one each of a user's feet with the non-skid surface 30 allowing for increased traction between the user's foot and base support 14, while still allowing for decreased traction between the base support 14 and the floor. The user can then support himself or herself against a surface by contacting the friction surface 26 of the glide pad 24. Such as support further expands the exercise repertoire to front and back, lateral or circular movements movement in alternate planes or other such variations. Again, the absence of a rigid track or rail allows the user to exercise about a much more varied range of motion.

Unless reasons exist to the contrary, judicial notice is taken of the following facts:

1. There is, in the relevant market comprising portable exercise equipment, a long felt dominant trend to provide devices and methods that allow for new, non-repetitive exercise motions in order to generally improve the effect of one's exercise regime.

2. There is, in the relevant market comprising portable exercise equipment, an long felt dominant trend to provide exercise equipment whose function can be non-monotonous, with such function itself being felt by itself to be inventive.

3. There is, in the relevant market comprising portable exercise equipment, an long felt dominant trend to provide.

4. There is no identified problem in the relevant market that provided sufficient impetus to develop the present invention. Calisthenic exercises such as push ups and devices to aid in such exercises utilized in the relevant market have been accepted for many years.

5. There is no identified problem in the relevant market that suggests a readily apparent specific set of solutions, one of which is the present invention.

6. There is no identified motivation in the relevant market that provided sufficient impetus for the development of the present invention.

7. Common sense judgment requires that valid reasoning justifying such judgment be set forth.

8. The Teaching-suggestion-motivation (TSM) test, per KSR v Teleflex, can provide helpful insight into evaluating the obviousness of the present invention. As such, there is no reason not to use the TSM test in evaluating the obviousness of the invention described and claimed herein.

9. Motivation. Making something better is a broad, general, long-existing motivation that applies to each invention. Broad, general, long-existing motivations likely provide little significant impetus to produce an invention. For example, in the exercise machine art, one broad, general, long-existing motivation is to make exercise machines versatile, so that more than one exercise can be produced on an exercise machine. This motivation typically provides little significant impetus to produce an invention. If, on the other hand, an exercise machine produces a greater than normal number of injuries, such a problem is more specific and provides stronger impetus to improve the machine.

10. Assessing Weight Accorded a Problem or Motivation. The weight or importance of a problem or motivation in leading to an invention is apprised by evaluating by (I) how long the problem has existed, (ii) the importance, and hence the driving force, of the problem or motivation, (iii) whether the problem or motivation reasonably suggests the invention, (iv) whether the motivation reasonably suggests a set of solutions of which the invention is one, (v) the trends, if any, produced by the problem or motivation, and (vi) other solutions produced in response to the motivation or problem. With respect to (I) above in this paragraph, if a problem has long existed without producing a solution, that suggests the invention is not obvious. With respect to (ii) above in this paragraph, if the problem appears to have little significance, that suggests it is not driving those of skill in the art toward the invention. With respect to (iii) above, if the problem suggests a solution other than the invention, this suggests the problem is not driving those of skill in the art toward the invention. With respect to (iv) above in this paragraph, if the problem suggests a set of solutions other than the invention, this suggests the problem is not leading toward the invention. With respect to (v) above, if the prevailing trends lead away from the invention or reinforce other solutions to the invention, that suggests the problem has not presented the invention as a solution. With respect to (vi) above in this paragraph, other solutions may reinforce the idea that the art is satisfied with the status quo and not interested in alternate solutions.

11. Common Sense. Proposed definitions of common sense are set forth below.

A. The People in Common (PIC) Definition: "the Earth is Flat".

One definition of common sense is what people in common would agree upon, that which they "sense" as their common natural understanding or would consider in most people's experience to be prudent and of sound judgment. This definition assumes a country with a population with a particular baseline language, customs and knowledge. The baseline knowledge is knowledge available and known by a large majority of the population, and is knowledge that typically does not require specialized knowledge or study; such baseline knowledge can change over time depending on the success of educational institutions, changing societal climes, etc. Under the people in common (PIC) definition, common sense often has been wrong and, for example, at one time held that the earth was flat. Even today it evidently is estimated that 50% or more of the people on earth believe the sun revolves around the earth. Others today use "common sense" to make the judgment that heavier bodies fall faster than light bodies.

B. The Common Man Sound Judgment (CMSJ) Definition.

A second definition of common sense is sound judgment based on a simple perception of the situation or facts. Sound judgment means sensible judgment based on valid reasoning. This suggests that a common sense judgment, if reliable, is subject to evaluation to see if there are reasons or criteria that support and justify the judgment. This definition assumes a country with a population with a particular baseline language, customs and knowledge. The baseline knowledge is knowledge available and known by a large majority of the population, and is knowledge that typically does not require specialized knowledge or study; such baseline knowledge can change overtime depending on the success of educational institutions, changing societal climes, etc. What might be common sense to an American might not be common sense to a person living in another country. An individual could move to the United States from India and what might appear common sense to an American would, because of the culture of India, make absolutely no sense to the Indian. In evaluating obviousness, however, it is usually, for better or worse, assumed that the Indian has the same baseline knowledge as individuals who have grown up in the United States.

C. The Ordinary Skill Sound Judgment (OSSJ) Definition.

A third definition of common sense is sound judgment by one of ordinary skill in the art based on a perception of the situation or facts in the context of the baseline knowledge in CMSJ and of specialized knowledge that is over and above said baseline knowledge and is attributed to one of ordinary skill in the art. As noted, sound judgment means sensible judgment based on valid reasoning. This suggests that a common sense judgment by one or ordinary skill in the art is, if reliable, subject to evaluation to see if there are reasons or criteria that support and justify the judgment. This definition assumes a country with a population with a particular baseline language, customs and knowledge. The baseline knowledge and specialized knowledge comprise knowledge available and known by a large majority of those of skill in the art; such baseline knowledge and specialized knowledge can change over time depending on the success of educational institutions, advances in the art, changing societal climes, etc. What might be common sense to an American of ordinary skill in the art might not be common sense to a person that lives in another country and appears to be one of ordinary skill in the art. In evaluating obviousness, however, it is usually, for better or worse, assumed that the person of ordinary skill in the art from India has the same baseline knowledge as individuals of skill in the art who have grown up in the United States. In some technically simple inventions, the ordinary skill sound judgment (OSSJ) may be commensurate with common man sound judgment (CMSJ) because there is little if any specialized knowledge required. For example, a new Christmas tree ornament design might not require any particular specialized knowledge over and above the baseline knowledge of the large majority of people. In contrast, many inventions obviously require a specialized knowledge over and above commonly held baseline knowledge, in which case such specialized knowledge will be utilized in the sound reasoning involved in ordinary skill sound judgment common sense.

As used herein, relying on common sense judgment requires that valid reasoning justifying such judgment be set forth. Hence, the common man sound judgment (CMSJ) and ordinary skill sound judgment (OSSJ) definitions are generally relied on herein in determining the obviousness of an invention.

12. Assessment of Trends. As used herein a trend is a general inclination or tendency. A trend generally (I) occurs over an extended period of time, (ii) occurs by or within a large number of individuals in the pertinent art, and (iii) often can be demonstrated by the existence of a significant number of printed references and by personal knowledge of those in the art. With respect to (I) above in this paragraph, a general inclination that lasts a short period of time, for example a day or a month, typically does not constitute a trend. With respect to (ii) above in this paragraph, if only a few individuals demonstrate a general inclination or tendency, such typically does not comprise a trend. With respect to (iii) above in this paragraph, if there are only a few documents that demonstrate a particular inclination or tendency, such typically does not demonstrate a trend.

The weight or importance of a trend in leading to an invention is evaluated by assessing (1) the length of time during which the trend has existed, (2) the number of individuals that believed or followed the trend, (3) the number of references that describe the trend, (4) the existence of other similar or related trends that might obfuscate or invalidate a trend and make it unlikely to lead to the invention, and (5) the existence of countervailing trends. If a trend is "buried" among many comparable trends in the art, it becomes more unlikely that one of ordinary skill will notice or utilize the trend. If a trend is overshadowed by countervailing trends, it becomes more unlikely that one of ordinary skill will notice or utilize the trend.

13. Assessing an Equivalent. As used herein, an equivalent is a structure or a system that is functionally or structurally equivalent to another structure or system. In determining whether it is obvious to substitute one "equivalent" for another, the following must be evaluated. First, is what is being substituted truly an equivalent? Is it functionally or structurally equivalent to what is being replaced? Second, if the equivalent is functionally or structurally equivalent, is it only structurally equivalent or only functionally equivalent? If it is only one or the other, this reduces the likelihood the equivalent would be used. Third, did the equivalent, or the invention, have to be modified to use the equivalent? If so, this reduces the likelihood the equivalent would be utilized. Fourth, is it likely the equivalent would be considered by one of ordinary skill in the art? If a new Christmas ornament utilizes a laminate including an outer protection coating from a prior Christmas ornament and substitutes that coating as an "equivalent" for the outer protective coating in another known Christmas ornament, then it arguably is likely that such a substitution would be considered by one of skill in the art. On the other hand, if the first substitute coating is normally found in a nuclear reactor in a submarine, it may be very unlikely, almost incredible, that such a coating would be considered and a substitution would be made. Simply stating that it would be known by one of skill in the art to substitute an equivalent is not, without providing reasons, believed sufficient. Otherwise such a generalized rationale could be used to invalidate most, if not all, patents known to man.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

In the following claims, those elements which do not include the words "means for" are intended not to be interpreted under 35 U.S.C. §112 ¶6.

The invention claimed is:

1. An exercise device comprising:
a graspable elongated handle having a first end opposite a second end;
a first lobe terminating said first end and having a first lower support surface;
a second lobe terminating said second end and having a second lower support surface;
a first low friction element affixed to or supported by said first lower support surface;
a second low friction element affixed to or supported by said second lower support surface;
wherein said first and second low friction elements can travel about a support surface thereby allowing a user to move the exercise device along the support surface about more than one direction in a horizontal plane;
wherein said first and second low friction elements each comprise a glide element formed of a generally smooth and rigid material such as to provide a low friction contact surface for contact with a flat support surface, wherein said glide disk forms a sphere segment; and
a compressible member mounted between a flat top of said glide element and the first or second lower support surface, thereby providing for a limited pivoting capability so that the low friction surface can maintain contact with a support surface when in use.

2. The exercise device of claim 1, wherein said compressible member is selected from the group consisting of: felt pads; rubber discs; and similar elastomeric gasket material.

3. A portable exercise device comprising a pair of the exercise device of claim 1.

4. An exercise device comprising:
a graspable elongated handle having a first end opposite a second end;
a first lobe terminating said first end and having a first lower support surface;
a second lobe terminating said second end and having a second lower support surface;
a first low friction element affixed to or supported by said first lower support surface;
a second low friction element affixed to or supported by said second lower support surface;
wherein said first and second low friction elements can travel about a support surface thereby allowing a user to move the exercise device along the support surface about more than one direction in a horizontal plane;
a first upper support surface opposite said first lower support surface;
a second upper support surface opposite said second lower support surface;
a first high friction element affixed to or supported by said first upper support surface;
a second high friction element affixed to or supported by said second upper support surface;
wherein said first and second high friction elements are adapted to improve traction between said upper support surfaces and a user's shoe or foot.

5. The exercise device of claim 1, farther comprising:
a first upper support surface opposite said first lower support surface;
a second upper support surface opposite said second lower support surface;
a first high friction element affixed to or supported by said first upper support surface;
a second high friction element affixed to or supported by said second upper support surface;
wherein said first and second high friction elements are adapted to improve traction between said upper support surfaces and a user's shoe or foot.

6. The exercise device of claim 2, further comprising:
a first upper support surface opposite said first lower support surface;
a second upper support surface opposite said second lower support surface;
a first high friction element affixed to or supported by said first upper support surface;
a second high friction element affixed to or supported by said second upper support surface;

wherein said first and second high friction elements are adapted to improve traction between said upper support surfaces and a user's shoe or foot.

7. A portable exercise device comprising a pair of the exercise device of claim 4.

8. A portable exercise device comprising a pair of the exercise device of claim 5.

9. A portable exercise device comprising a pair of the exercise device of claim 6.

* * * * *